US006330032B1

United States Patent
Boehlke

(10) Patent No.: US 6,330,032 B1
(45) Date of Patent: Dec. 11, 2001

(54) MOTION ADAPTIVE DE-INTERLACE FILTER

(75) Inventor: Kenneth A. Boehlke, Beaverton, OR (US)

(73) Assignee: Focus Enhancements, Inc., Campbell, CA (US)

( * ) Notice: Subject to any disclaimer, the term of this patent is extended or adjusted under 35 U.S.C. 154(b) by 0 days.

(21) Appl. No.: 09/409,589

(22) Filed: Sep. 30, 1999

(51) Int. Cl.$^7$ .............................. H04N 7/01; H04N 11/20
(52) U.S. Cl. ................... 348/452; 348/443; 348/448; 348/451; 348/458
(58) Field of Search .................... 348/443, 448, 348/451, 452, 458, 576, 700, 701; H04N 7/01, 11/20

(56) References Cited

U.S. PATENT DOCUMENTS

| | | | |
|---|---|---|---|
| 5,398,071 | * 3/1995 | Gove et al. | 348/443 |
| 5,446,497 | * 8/1995 | Keating et al. | 348/443 |
| 5,467,138 | * 11/1995 | Gove | 348/452 |
| 5,469,217 | * 11/1995 | Ibental et al. | 348/447 |
| 5,526,053 | * 6/1996 | Dorricott et al. | 348/443 |
| 5,784,114 | * 7/1998 | Borer et al. | 348/452 |
| 5,886,745 | * 3/1999 | Muraji et al. | 348/448 |
| 6,118,488 | * 9/2000 | Huang | 348/452 |

* cited by examiner

Primary Examiner—Reinhard J. Eisenzopf
Assistant Examiner—Brian P. Yenke
(74) Attorney, Agent, or Firm—Daniel J. Bedell; Smith-Hill and Bedell

(57) ABSTRACT

The invention provides a method for filtering motion effects from a de-interlaced image and an apparatus associated therewith. The method assumes that the de-interlaced image is formed by a combination of a first interlaced image and a second interlaced image. A first step in the method is to interpolate an interpolated line between two lines in a region of the first interlaced image. A variance value is then determined between the interpolated line and a corresponding line in a corresponding region of the second interlaced image. A threshold value will have been predetermined in the system and the variance value is compared against that threshold value. If the variance value is less than the threshold value then the correlation is strong and the corresponding line is displayed in the de-interlaced image. Otherwise if the variance value exceeds the threshold value then the interpolated line is displayed. This process is repeated for each pixel until the entire image is displayed.

21 Claims, 4 Drawing Sheets

MOTION ADAPTIVE DE-INTERLACE FILTER

BACKGROUND OF THE INVENTION

The present invention relates generally to apparatus and methods for filtering motion effects from a de-interlaced image. More particularly, the invention relates to an apparatus and method for reducing motion artifacts on a pixel-by-pixel basis keying from the surrounding region of a progressive image formed by the combination by two or more interlaced images.

Conventional televisions use an interlaced technology whereby in a first image field the odd horizontal lines of an image are refreshed. Subsequently, in the next video field the even lines are refreshed. Thus, providing that the fields are refreshed at a sufficiently fast rate, the image appears to a viewer as being a single image and as the fields are refreshed the images can clearly show motion. However, on a progressive television there is no interlacing. Thus, all odd and even lines are displayed simultaneously and refreshed sequentially.

Progressive televisions are becoming more popular. However, television broadcasts are designed for use with conventional interlaced televisions. Therefore, there is a need for progressive televisions to be able to adapt to use interlaced images and to be able to display those images. One problem with merging such images into a progressive image is when fast motion appears in the image sequence.

One solution has been to interpolate the even lines in the field having the odd lines, and vice versa. However, since only half of the input lines make up each of the resultant output images the usable vertical frequency response is also halved. The merged image has merging artifacts that are particularly noticeable when the image sequence incorporates motion. A better solution would fix these merging artifacts. The prior art image sequence of FIGS. 1A–1C illustrates two images from an interlaced video sequence followed by a resulting de-interlaced image, respectively.

As can be seen in FIG. 1A, a vertical bar 12 is displayed on a first interlaced image 10. The vertical bar 12 is displayed on the right side of reference line 20. In the next interlaced image 14 the vertical line 12 has been horizontally shifted. This is due to horizontal motion of the vertical line in the image sequence. If subsequent interlaced images were shown it would be likely that the vertical line 12 would again be displaced along the X-axis of each of the images 10, 14. Taking these two interlaced images 10, 14 and merging the two interlaced images 10, 14 without any filtering would create a de-interlaced image 16 having a merged bar 18. The merged bar 18 is a combination of the two images of the vertical bar 12 where the vertical bar 12 is displaced horizontally due to the motion. Thus, the merged bar 18 would look similar to a zipper as shown in FIG. 1C. It is for this reason that prior art filters for motion artifacts of this type are referred to as zipper filters, or motion filters.

Conventional motion filters remove the zipper artifacts by buffering the first interlaced image 10 and the second interlaced image 14 and then comparing those two images to determine motion. However, this requires a great deal of frame memory (at least two fields), which can be costly. Accordingly, it is an object of this invention to provide a filter which minimizes motion defects.

It is another object of this invention to provide a filter that minimizes additional hardware requirements.

It is still another object of this invention to provide a filter which operates on pixel-by-pixel basis keying from a local region of an image.

These and other objects of the invention will be obvious and will appear hereinafter.

SUMMARY

The aforementioned and other objects are achieved by the invention which provides a method for filtering motion effects from a de-interlaced image and an apparatus associated therewith. The method assumes that the de-interlaced image is formed by a combination of a first interlaced image and a second interlaced image. An example of the application of such a device is taking standard television images and combining them for display on a progressive television.

A first step in the method is to create an interpolated line between two horizontal lines in a region of the first interlaced image. The first interlaced image is made of multiple horizontal lines.

A variance value is then determined between the interpolated line and a corresponding line in a corresponding region of the second interlaced image. The variance calculation results in a variance value that is indicative of an interrelationship between the two lines.

A threshold value will have been predetermined in the system and the variance value is compared against that threshold value. If the variance value is less than the threshold value, then the correlation is strong and the corresponding line is displayed in the de-interlaced image. Otherwise if the variance value exceeds the threshold value, then the interpolated line is displayed. This process is repeated for each pixel until the entire screen is displayed. This allows a window to be moved across the screen allowing the motion defects to be determined in a relatively small region and thus creating a detailed image whenever possible. In the preferred embodiment, the region is 11 pixels wide and 3 pixels in height.

The invention can also incorporate an alpha blender. The alpha blender operates between a lower limit and an upper limit to soften the switching between interpolated pixels and merged pixels thereby further enhancing the image.

In further aspects, the invention provides apparatus in accord with the methods described above. The aforementioned and other aspects of the invention are evident in the drawings and in the description that follows.

BRIEF DESCRIPTION OF THE DRAWINGS

The foregoing and other objects of the invention, the various features thereof, as well as the invention itself, may be more fully understood from the following description, when read together with the accompanying drawings in which:

FIGS. 1A and 1B show a moving bar displaced by time and FIG. 1C shows a de-interlaced image formed from the combination of FIGS. 1A and 1B;

DETAILED DESCRIPTION

While the present invention retains utility within a wide variety of video display devices and may be embodied in several different forms, it is advantageously employed in connection with the combination of two interlaced images to form a single de-interlaced image. Though this is the form of the preferred embodiment and will be described as such, this embodiment should be considered illustrative and not restrictive.

Figure 1A:
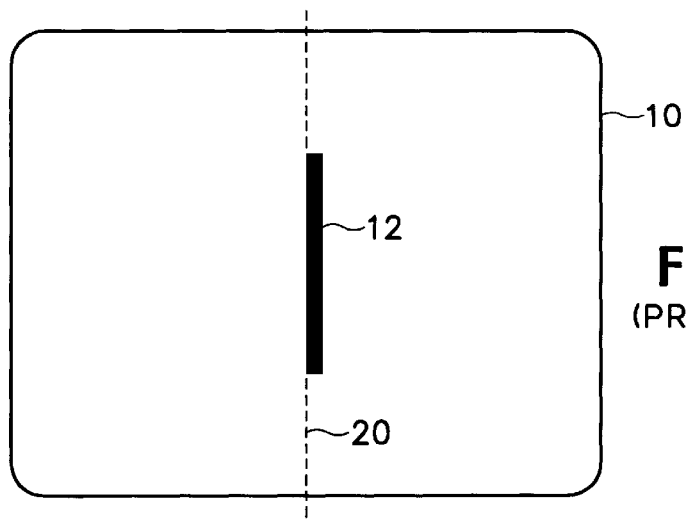
FIGS. 1A, 1B and 1C show a prior art de-interlacing system where
Figure 1B:
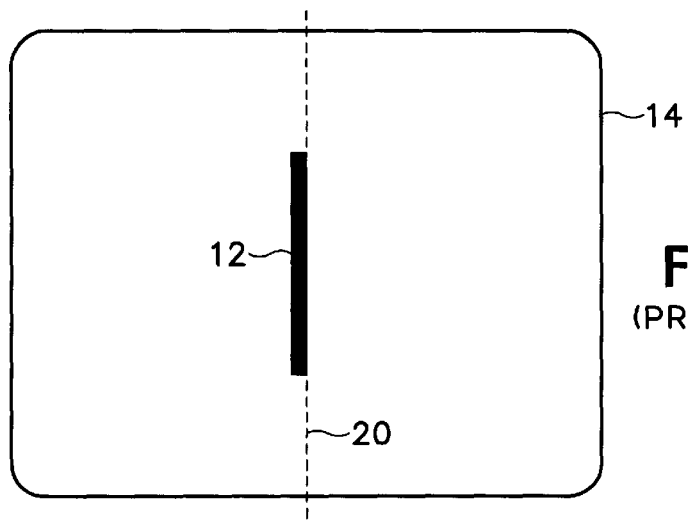
Figure 1C:
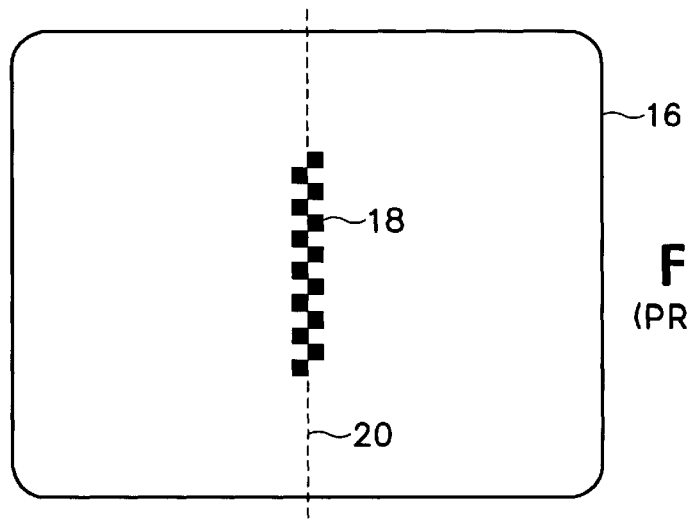
Figure 2:
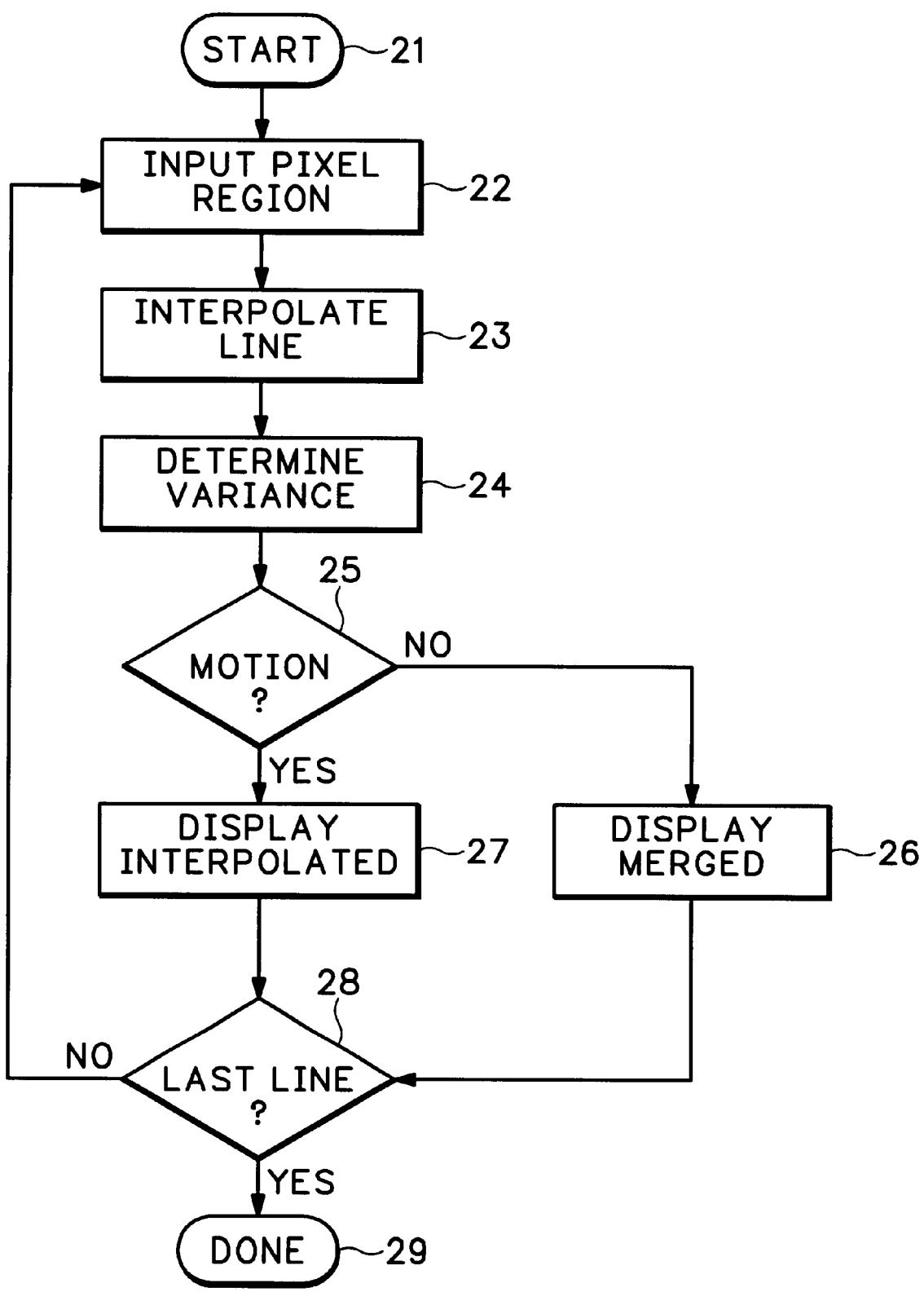
FIG. 2 shows a flow chart of the method of the invention.

Referring now to FIG. 2 there is shown a flow chart depicting a method of the invention. When a system requires that two or more interlaced images be merged into a de-interlaced image the process is started 21. A pixel region is input 22 from each of two regions. The system has predetermined numbers of pixels in horizontal and vertical directions which define the region size. That is, the pixel region is a two-dimensional array of pixels the size of which is chosen by the designer. In the preferred embodiment the region is 11 by 3 where 11 represents the number of pixels in a horizontal direction and 3 is the number of pixels in a vertical direction. One skilled in the art will understand that region size can be adjusted according to the needs of the application. One region of such region size is input 22 from each interlaced image for analysis.

Once the pixel region is input 22 then a line is interpolated in that pixel region 23. The interpolated line can be created using any of various interpolation methods. In the preferred embodiment, however, each line is given an equal weighting. Therefore, the interpolated line for each pixel in the interpolated line is one half the sum of the intensity of the upper pixel and the intensity of the lower pixel for each of the 11 pixels, thus creating the interpolated line within the region.

Next a variance is determined 24. The variance is generated by using a variance equation or other mathematical calculation to generate a variance value. In this case the variance equation is as follows:

$$\% MAE(n) = \frac{\sum_{i=-5}^{+5}\left|P_{cur}(n+1) - \frac{1}{2}[P_{opp1}(n+i) + P_{opp2}(n+i)]\right| - \frac{1}{2}\sum_{i=-5}^{+5}|P_{opp1}(n+i) - P_{opp2}(n+i)|}{P_{ave}(n) + C} \quad (1)$$

$P_{ave}(n)$ is defined as:

$$P_{ave}(n) = \frac{1}{4}\sum_{i=-5}^{+5} P_{opp1}(n+1) + \frac{1}{4}\sum_{i=-5}^{+5} P_{opp2}(n+i) + \frac{1}{2}\sum_{i=-5}^{+5} P_{cur}(n+i) \quad (2)$$

where for each equation (1) and (2):
 $P_{cur}$—current pixel value in this field;
 $P_{opp1}$—Pixel value from the opposite field one line above the current;
 $P_{opp2}$—Pixel value from the opposite field one line below the current;
 $P_{ave}$—Average pixel value in this region;
 C—constant;
 n—Pixel index.

The result of equation (1) is the normalized field-to-field variance measure by the percentage of mean absolute error ("MAE"). By looking at the variance between the current line and the estimate of the current line i.e., the interpolated line, as shown in the first numerator term, image motion can be detected. The second numerator term of the equation removes the variance contribution within the fields themselves. That is, if there is a significant vertical change in an edge not caused by motion this removes the false trigger. This vertical edge is likely to cause a large error in the first numerator term, as the amplitude of the current line is not likely to be the average of the lines above and below it. The second term senses larger vertical changes and lowers %MAE by an amount equal to the possible error in the first term. Now, large %MAE can be attributed to the field-to-field variance caused by the merging of unrelated image regions as a result of their relative motion.

In the denominator $P_{ave}$ is used to normalize the %MAE for constant range under differing average picture levels, and the C is a constant that is adjusted to reduce sensitivity at low average picture levels and further removes divide by zero errors.

%MAE measures the field-to-field variance. When the variance is low the fields are correlated, when the variance is high the field correlation is low.

Determination of whether the variance is too high or low is accomplished by comparing the variance value to a threshold value. The threshold value in the preferred embodiment is a fixed value predetermined by the system designer. One skilled in the art will understand that a variable threshold may be used and such threshold may be alterable by a user. Each of the latter are simply design choices.

In the preferred embodiment, the threshold value is between 10% and 25% of the mean absolute error.

If the %MAE variance value is greater than the threshold value then the variance between the interpolated line which would have been the expected result and the line to which it was compared in the second interlaced frame is high, then it is determined that there is motion in the image. In that case the interpolated line is used in the progressive image or the de-interlaced image as will be described later.

The aforementioned comparison is performed in the next step to determine whether there is motion 25. As described, if the correlation is low (high variance or MAE%) then there is motion and the interpolated line is displayed 27. Otherwise, if the correlation is high, that is the %MAE value is less than the threshold value, then the merged line is displayed 26. The merged line is the line from the second interlaced image which is merged into the first interlaced image to form the progressive result.

Once it is determined which line will be used, a check is done to determine whether the last line has been processed 28. If not, the method loops back to input the next pixel region 22 and the process is repeated. Otherwise the process is done 29.

Figure 3A:
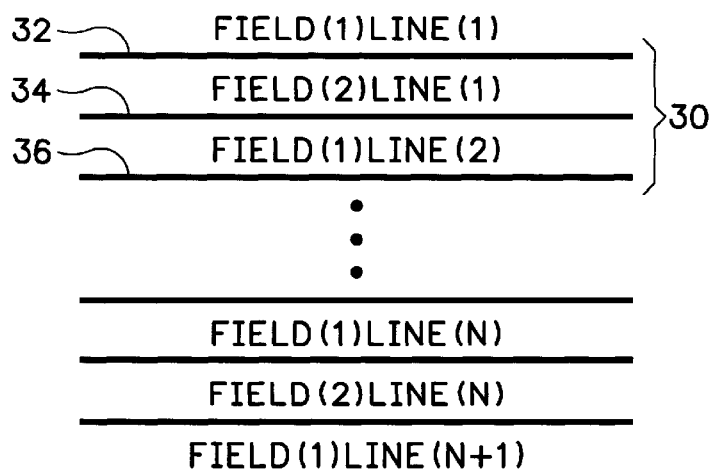
FIGS. 3A and 3B is a diagram illustrating the analysis performed by the invention.
Figure 3B:
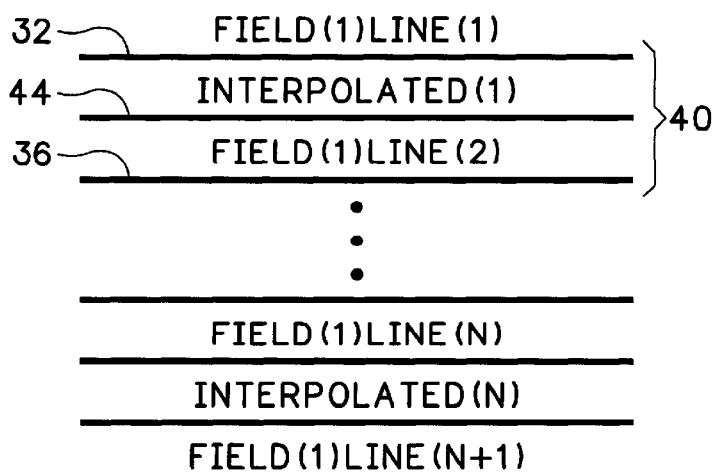

Looking now at FIGS. 3A and 3B the lines are displayed graphically to show the interpolation and merger comparison. FIG. 3A shows a merged frame. That is, FIG. 3A is strictly a merger of regions from two interlaced images. As can be seen in the first region 30, line 32 is field 1 line 1 from the first interlaced image and line 36 is field 1 line 2 from that same first interlaced image. The line in between line 34 is then the result of the comparison described previously. In this case a merged line was determined to be needed and, therefore, is field 2 line 1 from the second interlaced image.

In contrast the first region 40 of FIG. 3B shows line 42 being field 1 line 1 of the first interlaced image and as previously line 46 is field 1 line 2 of the first interlaced image. However, in this example line 2 44 has been determined to require an interpolated line 1.

Motion is detected by correlating the lines of opposite fields with the average of the field lines above and below the present line. If the correlation is strong the opposite field line is merged. If the correlation is weak the average of two lines from the present field is used. All the lines of the present field are taken without alteration.

There is one instance where the system would seem to break down. That is, when there is a weak correlation caused by motion the present field has the only information on how to reconstruct the image. The other fields' information in that region is not related to the moving object. However, consider the case of a single horizontal line with no motion. The line appears in only one field and because the correlation is weak and, in the case of a perfectly horizontal, correlation is nil and that line would be dropped from the resulting frame. However, as will be seen, the correlation in the opposite field is also very low and half of the line will be included above and below its location. This then yields a doubling of intensity just all in one frame. Thus, it is going to detect motion and interpolate but will not miss the line. The key is that the correlation is calculated over many horizontal pixels. Too few included pixels causes a chance of a motion misfire. That is, motion would be detected and such lines would be missed. However, too many pixels and the system would not detect motion at the point where a zipper artifact becomes noticeable. As previously stated in the preferred embodiment the optimum number of pixels is 11.

Figure 4A:
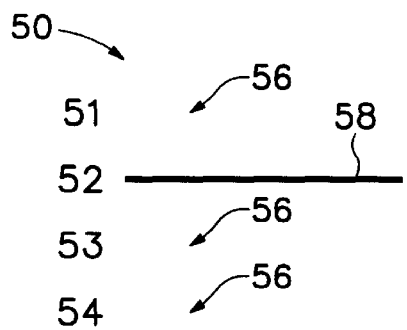
FIGS. 4A, 4B and 4C show an example of how the invention handles the special case of a horizontal line.
Figure 4B:
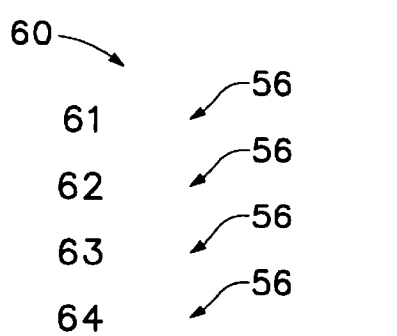
Figure 4C:
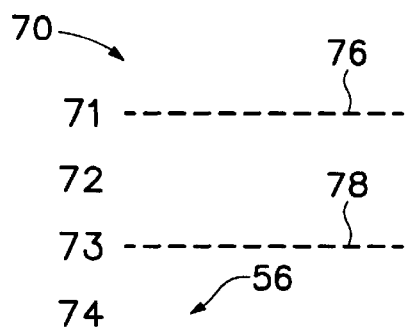

Consider the example of the horizontal line which is displayed in FIGS. 4A, 4B and 4C. FIG. 4A shows the first interlaced image. FIG. 4B shows the second interlaced image and FIG. 4C shows the de-interlaced image. In FIG. 4A a region 50 is made up of four lines 51, 52, 53, 54. Lines 51, 53 and 54 are blank 56 whereas line 52 has a horizontal line 58. In the second interlaced image a corresponding region 60 is shown where the corresponding lines 61, 62, 63 and 64 are each blank 56. A merger of the two as previously discussed would seem to indicate that line 52 would be dropped. However, as can be seen from the merged region 70 when the process is performed a line previous to line 51 and 52 would be merged in and line 51 would be checked for correlation against an interpolated line. The interpolated line is a line of half the intensity of the horizontal line 58. Assuming that the threshold is set appropriately, the interpolated value is then used because motion would be detected. That is, the interpolated line is then compared against line 61 and the correlation is weak, thus the interpolated line is used. Therefore, line 71 would be a horizontal line of half the intensity of horizontal line 58.

Likewise, line 52 is checked for correlation against an interpolated line and motion would be detected. The interpolated line of lines 61 and 63 is then used and line 72 is blank.

The process is then repeated again and line 53 is compared against an interpolated line which is a horizontal line of half the intensity 78. Thus, in the resulting region line 71 and 73 would each be horizontal lines 76, 78 of half intensity and, thus, are displayed to a user as a slightly blurred horizontal line of full intensity.

Figure 6:
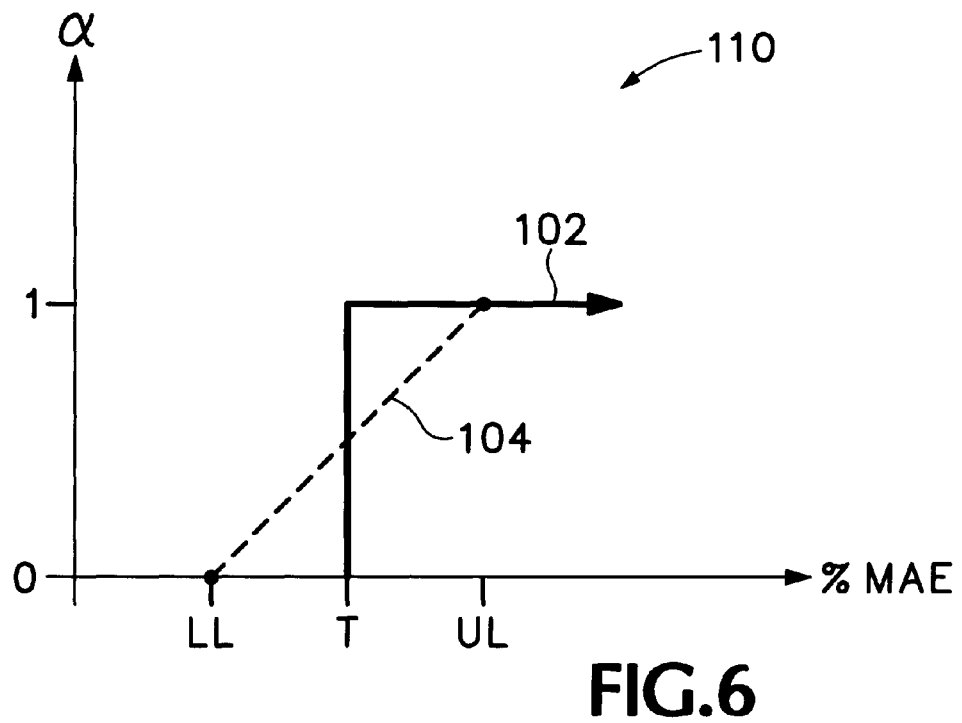
FIG. 6 shows a graph contrasting the system utilizing the alpha blender and one without.

FIG. 6 shows a graph in which a line 102 illustrates schematically a switch from the merged output to the interpolated output when the % mean absolute error, or variance, exceeds the threshold T.

To minimize switching artifacts an alpha blend of the interpolated and merged outputs will be used.

Figure 5:
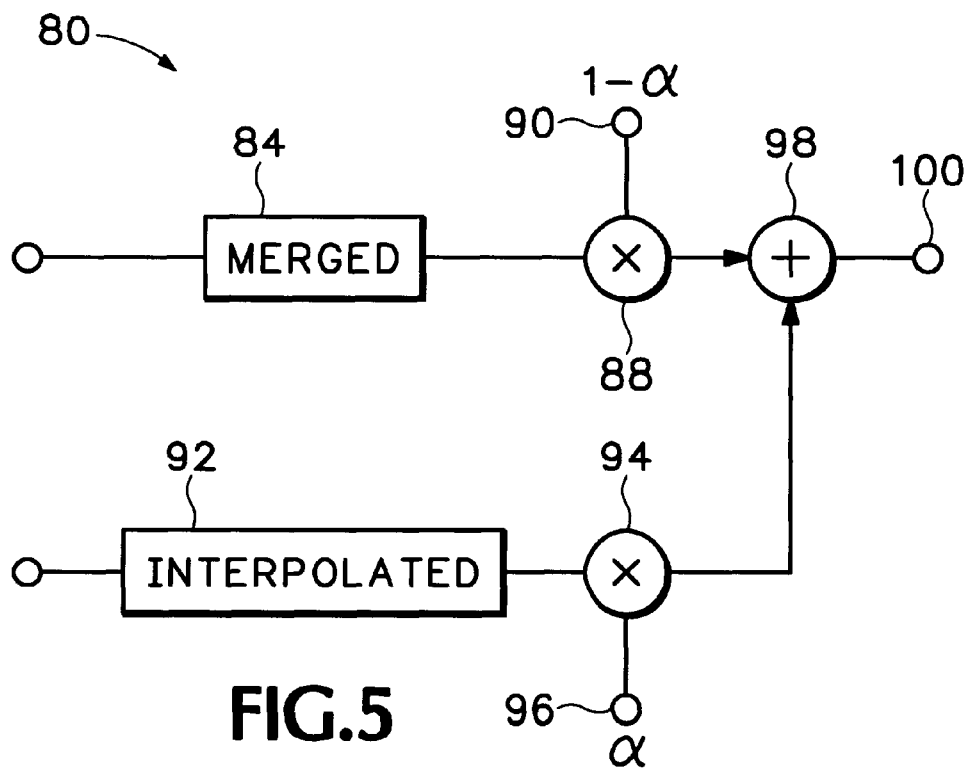
FIG. 5 shows a block diagram of the invention incorporating an alpha blender.

Referring to FIG. 5, the interpolated output 92 is provided to a multiplier 94 which multiplies the interpolated output by a coefficient α and the merged output 84 is supplied to a multiplier 88 which multiplies the merged output by (1−α). The products provided by the multipliers 88 and 94 are supplied to an adder 98 which adds the outputs of the multipliers and provides the blended output 100.

The dashed line 104 in FIG. 6 illustrates an alpha blend of the interpolated and merged outputs. Referring to FIG. 6, the coefficient α varies linearly with %MAE over a range from LL to UL. The switchover starts at 50% of the threshold and is complete at 150% of the threshold. One skilled in the art will realize that the aforementioned 50% and 150% of the threshold are adjustable and that these are examples in the preferred embodiment. The 50% is the lower limit, LL, in the graph 110 whereas the 150% is the upper limit, UL, in the graph 110. The graph 110 has alpha as its ordinate and percent mean absolute error (%MAE) as its abscissa. In the system being described herein, the interpolated line is weighted as the lower limit is exceeded. Therefore, instead of a radical switch the switch is transitioned as shown by dashed line 104. In this case where the threshold is halfway between UL and LL the transition line 104 is at a 45-degree angle. However, depending upon the application, this angle may be adjusted accordingly.

For a given threshold value and mean signal amplitude the amount of field-to-field difference needed to trigger the motion detector increases with the line-to-line variance. As the line-to-line variance increases, the error in the average line's estimate also increases. Thus, the value at which motion is detected must also increase. Consider three cases: a constant amplitude image traveling through an image with high variability, two images with high variability traveling through each other, and a high-variability stationary image. In the first case the percent %MAE is large in high variability frame and medium in the constant frame. The image will be interpolated in one frame and blended merge interpolated in the other.

In the second case the percent of %MAE is medium always. The image will always be a blended merge and interpolated.

In the last case the percent %MAE is always low and the image will always be merged.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of processing first and second interlaced images to create a de-interlaced image, comprising:

defining a region of the first image that contains segments of first and second successive lines of pixels and contains a pixel position between the first and second lines;

defining a corresponding region of the second image that contains a segment of a line of pixels, said segment of said line of pixels of the second image including a pixel at a position corresponding to said pixel position of the first image, determining a variance value indicative of the variance between said segment of said line of pixels of the second image and a line segment interpolated between said segments of said first and second lines of pixels of the first image, if the variance value exceeds an upper threshold value, selecting a pixel derived from the first image by interpolating between the pixels of said segments of the first and second lines, if the variance value is less than a lower threshold value, selecting the pixel of the second image at said position corresponding to said pixel position of the first image, and including the selected pixel in the de-interlaced image at a position corresponding to said pixel position of the first image.

2. A method according to claim 1, wherein the variance value is a normalized variance value.

3. A method according to claim 2, wherein the variance value is normalized by a weighted sum of the pixels of said regions of the first and second images.

4. A method according to claim 1, wherein the variance value includes a term representing difference between said region of the first image and said region of the second image and a term representing variation in pixels within said region of the first image.

5. A method according to claim 1, wherein the variance value is derived from mean average error between said region of the first image and said region of the second image.

6. A method according to claim 1, wherein the upper threshold value is equal to the lower threshold value.

7. A method according to claim 1, wherein the upper threshold value is greater than the lower threshold value and, if the variance value is between the lower threshold value and the upper threshold value, the method comprises including a weighted sum of the interpolated pixel derived from the first image and the pixel of the second image in the de-interlaced image at said position corresponding to said pixel position of the first image.

8. A method of processing first and second interlaced images to create a de-interlaced image, wherein the de-interlaced image is composed of a first array of lines at positions corresponding to lines of the first interlaced image and a second array of lines at positions corresponding to lines of the second interlaced image, said method comprising:

including pixels of first and second successive lines of the first image at corresponding pixel positions of the de-interlaced image, defining a region of the first image that contains segments of said first and second successive lines of pixels and contains a pixel position between the first and second lines;

defining a corresponding region of the second image that contains a segment of a line of pixels, said segment of said line of pixels of the second image including a pixel at a position corresponding to said pixel position of the first image, determining a variance value indicative of the variance between said segment of said line of pixels of the second image and a line segment interpolated between said segments of said first and second lines of pixels of the first image, if the variance value exceeds an upper threshold value, selecting a pixel derived from the first image by interpolating between the pixels of said segments of the first and second lines, if the variance value is less than a lower threshold value, selecting the pixel of the second image at said position corresponding to said pixel position of the first image, and including the selected pixel in the de-interlaced image at a position corresponding to said pixel position of the first image.

9. A method according to claim 8, wherein the variance value is a normalized variance value.

10. A method according to claim 9, wherein the variance value is normalized by a weighted sum of the pixels of said regions of the first and second images.

11. A method according to claim 8, wherein the variance value includes a term representing difference between said region of the first image and said region of the second image and a term representing variation in pixels within said region of the first image.

12. A method according to claim 8, wherein the variance value is derived from mean average error between said region of the first image and said region of the second image.

13. A method according to claim 8, wherein the upper threshold value is equal to the lower threshold value.

14. A method according to claim 8, wherein the upper threshold value is greater than the lower threshold value and, if the variance value is between the lower threshold value and the upper threshold value, the method comprises including a weighted sum of the interpolated pixel derived from the first image and the pixel of the second image in the de-interlaced image at said position corresponding to said pixel position of the first image.

15. A method of detecting motion between first and second interlaced images, comprising:

defining a region of the first image that contains segments of first and second successive lines of the first image and contains a pixel position between the first and second lines;

defining a corresponding region of the second image that contains a segment of a line of the second image, said segment of said line of the second image including a pixel corresponding to said pixel position of the first image, determining a variance value indicative of the variance between said segment of said line of the second image and a line segment interpolated between said segments of said first and second lines of the first image, and outputting a signal in a first state if the variance value exceeds an upper threshold value and outputting said signal in a second state if the variance value is less than a lower threshold value.

16. A method according to claim 6, wherein the variance value is a normalized variance value.

17. A method according to claim 15, wherein the variance value is normalized by a weighted sum of the pixels of said regions of the first and second images.

18. A method according to claim 15, wherein the variance value includes a term representing difference between said region of the first image and said region of the second image and a term representing variation in pixels within said region of the first image.

19. A method according to claim 15, wherein the variance value is derived from mean average error between said region of the first image and said region of the second image.

20. A method according to claim 15, wherein the upper threshold value is equal to the lower threshold value.

21. A method according to claim 15, wherein the upper threshold value is greater than the lower threshold value.

* * * * *

UNITED STATES PATENT AND TRADEMARK OFFICE
CERTIFICATE OF CORRECTION

PATENT NO. : 6,330,032 B1  
DATED : December 11, 2001  
INVENTOR(S) : Kenneth A. Boehlke Page 1 of 1

It is certified that error appears in the above-identified patent and that said Letters Patent is hereby corrected as shown below:

<u>Column 8,</u>  
Line 43, "6" should be deleted and replaced with -- 15 --.

Signed and Sealed this

Fourteenth Day of May, 2002

*Attest:*

*Attesting Officer*

JAMES E. ROGAN  
*Director of the United States Patent and Trademark Office*